(12) United States Patent
Wang

(10) Patent No.: US 12,425,659 B2
(45) Date of Patent: Sep. 23, 2025

(54) FILTERING METHOD AND APPARATUS, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventor: Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 88 days.

(21) Appl. No.: 18/472,484

(22) Filed: Sep. 22, 2023

(65) Prior Publication Data

US 2024/0015336 A1    Jan. 11, 2024

Related U.S. Application Data

(63) Continuation of application No. PCT/CN2022/118321, filed on Sep. 13, 2022.

(30) Foreign Application Priority Data

Sep. 28, 2021    (CN) .......................... 202111144705.7

(51) Int. Cl.
*H04N 19/82* (2014.01)
*H04N 19/105* (2014.01)
(Continued)

(52) U.S. Cl.
CPC ........... *H04N 19/82* (2014.11); *H04N 19/105* (2014.11); *H04N 19/176* (2014.11); *H04N 19/186* (2014.11); *H04N 19/30* (2014.11)

(58) Field of Classification Search
CPC .. H04N 19/105; H04N 19/176; H04N 19/186; H04N 19/30; H04N 19/82; H04N 19/85
See application file for complete search history.

(56) References Cited

U.S. PATENT DOCUMENTS

| 7,330,509 B2 | 2/2008 | Lu et al. |
| 7,983,496 B2 | 7/2011 | Liu et al. |
| (Continued) | | |

FOREIGN PATENT DOCUMENTS

| CN | 1816149 A | 8/2006 |
| CN | 110443127 A * | 11/2019 |
| (Continued) | | |

OTHER PUBLICATIONS

The World Intellectual Property Organization (WIPO) International Search Report for PCT/CN2022/118321 Dec. 14, 2022 12 Pages (including translation).

(Continued)

*Primary Examiner* — Md N Haque
(74) *Attorney, Agent, or Firm* — ANOVA LAW GROUP PLLC

(57) ABSTRACT

A deep learning-based filtering method includes obtaining a reconstructed image of luma component corresponding to an encoded image and chroma component information corresponding to the encoded image; generating an input parameter of a deep learning filter according to the reconstructed image of luma component and the chroma component information; and generating, based on the input parameter to the deep learning filter, a filtered image corresponding to the reconstructed image of luma component.

18 Claims, 12 Drawing Sheets

(51) Int. Cl.
  *H04N 19/176* (2014.01)
  *H04N 19/186* (2014.01)
  *H04N 19/30* (2014.01)

(56) References Cited

U.S. PATENT DOCUMENTS

| | | | |
|---|---|---|---|
| 8,085,852 B2 | 12/2011 | Liu et al. | |
| 8,238,442 B2 | 8/2012 | Liu | |
| 8,526,495 B2 | 9/2013 | Liu et al. | |
| 9,049,452 B2 | 6/2015 | Liu et al. | |
| 9,363,511 B2 | 6/2016 | Zhang et al. | |
| 9,769,472 B2 | 9/2017 | Liu et al. | |
| 10,136,144 B2 | 11/2018 | Liu et al. | |
| 10,205,968 B2 | 2/2019 | Liu et al. | |
| 10,397,569 B2 | 8/2019 | Liu et al. | |
| 10,455,231 B2 | 10/2019 | Xu et al. | |
| 10,511,834 B2 | 12/2019 | Xu et al. | |
| 10,542,253 B2 | 1/2020 | Liu et al. | |
| 10,567,752 B2 | 2/2020 | Zhao et al. | |
| 10,575,013 B2 | 2/2020 | Liu et al. | |
| 10,582,195 B2 | 3/2020 | Liu et al. | |
| 10,587,881 B2 | 3/2020 | Xu et al. | |
| 10,587,885 B2 | 3/2020 | Ye et al. | |
| 10,595,019 B2 | 3/2020 | Chernyak et al. | |
| 10,609,384 B2 | 3/2020 | Chen et al. | |
| 10,609,402 B2 | 3/2020 | Zhao et al. | |
| 10,609,403 B2 | 3/2020 | Xu et al. | |
| 10,666,968 B2 | 5/2020 | Xu et al. | |
| 2004/0034611 A1 | 2/2004 | Kee et al. | |
| 2016/0309184 A1* | 10/2016 | Choe | H04N 19/593 |
| 2017/0094271 A1 | 3/2017 | Liu et al. | |
| 2020/0213587 A1* | 7/2020 | Galpin | H04N 19/176 |
| 2021/0012537 A1 | 1/2021 | Xu et al. | |
| 2021/0142520 A1* | 5/2021 | Krishnan | G06T 5/70 |
| 2021/0368211 A1* | 11/2021 | Wan | H04N 19/117 |
| 2021/0409783 A1* | 12/2021 | Wan | H04N 19/117 |
| 2023/0209097 A1 | 6/2023 | Wan et al. | |
| 2023/0254507 A1* | 8/2023 | Dumas | H04N 19/176 375/240.12 |

FOREIGN PATENT DOCUMENTS

| | | |
|---|---|---|
| CN | 110729734 A | 1/2020 |
| CN | 111194555 A | 5/2020 |
| CN | 112218097 A | 1/2021 |
| WO | 2017222140 A1 | 12/2017 |
| WO | 2020177133 A1 | 9/2020 |
| WO | 2020177134 A1 | 9/2020 |

OTHER PUBLICATIONS

"Versatile video coding (draft 2)", B. Bross, J. Chen, S. Liu, ISO/IEC JTC1/SC29/WG11 JVET-K1001.
"General Video Coding Technology in Responses to the Joint Call for Proposals on Video Compression with Capability beyond HEVC", B. Bross, K. Andersson, M. Blaser, V. Drugeon, S.-H. Kim, J. Lainema, J. Li, S. Liu, J.-R. Ohm, G. Sullivan, R. Yu, IEEE Transactions on Circuits and Systems for Video Technology, 2019.
"Deep Learning-Based Technology in Responses to the Joint Call for Proposals on Video Compression with Capability beyond HEVC", D. Liu, Z. Chen, S. Liu, F. Wu, IEEE Transactions on Circuits and Systems for Video Technology, 2019.
"Residual convolutional neural network based in-loop filter with intra and inter frames processed respectively for AVS3", Han Zhu, Xiaozhong Xu and Shan Liu, 2020 IEEE International Conference on Multimedia & Expo Workshops (ICMEW), London, UK, Jul. 2020.
"Joint temporal-spatial bit allocation for video coding with dependency", S. Liu, CCJ. Kuo, IEEE Transactions on Circuits and Systems for Video Technology 15 (1), 15-26.
"HEVC Screen Content Coding Draft Text 4", R. Joshi, S. Liu, G. Sullivan, J. Xu, Y. Ye, ISO/IEC JTC1/SC29/WG11 JCTVC-U1005.
"Intra Block Copy in HEVC Screen Content Coding Extensions", X. Xu, S. Liu, T.-D. Chuang, Y.-W. Huang, S. Lei, K. Rapaka, C. Pang, V. Seregin, Y. Wang, M. Karczewicz, IEEE Journal on Emerging and Selected Topics in Circuits and Systems, vol. 6, Issue 4, pp. 409-419.
"Overview of HEVC extensions on screen content coding", S. Liu, X. Xu, S. Lei, K. Jou, APSIPA Transactions on Signal and Information Processing, vol. 4.
"Screen content coding test model 1 (SCM 1)", R. Joshi, J. Xu, R. Cohen, S. Liu, Z. Ma, Y. Ye, JCTVC-Q1014, Valencia, Spain.
"Block vector prediction for intra block copying in HEVC screen content coding", X. Xu, S. Liu, TD Chuang, S. Lei, 2015 Data Compression Conference, 273-282.
"Intra block copy in Versatile Video Coding with Reference Sample Memory Reuse", X. Xu, X. Li, S. Liu, 2019 Picture Coding Symposium (PCS), 1-5.
"Screen Content Coding Using Non-Square Intra Block Copy for HEVC", Chun-Chi Chen, Xiaozhong Xu, Ru-Ling Liao, Wen-Hsiao Peng, Shan Liu, and Shawmin Lei, 2014 IEEE International Conference on Multimedia and Expo (ICME), Chengdu, China, Jul. 2014.
"Intra Block Copy in AVS3 Video Coding Standard", Yingbin Wang, Xiaozhong Xu and Shan Liu, 2020 IEEE International Conference on Multimedia & Expo Workshops (ICMEW), London, UK, Jul. 2020.
"Hybrid global-local motion compensated frame interpolation for low bit rate video coding", S. Liu, CCJ Kuo, JW Kim, Journal of Visual Communication and Image Representation 14 (1), 58-76.
"Nonlinear motion-compensated interpolation for low-bit-rate video", S. Liu, JW. Kim, CCJ. Kuo, Applications of Digital Image Processing XXIII 4115, 203-213.
"Intra mode coding in HEVC standard", X. Zhang, S. Liu, S. Lei, 2012 Visual Communications and Image Processing, pp. 1-6.
"Bit-depth scalable coding for high dynamic range video", Shan Liu, W.-S. Kim, Anthony Vetro, Visual Communications and Image Processing 2008, vol. 6822.
China National Intellectual Property Administration (CNIPA) Office Action 1 for 202111144705.7, May 24, 2024 12 Pages (including translation).
Liqiang Wang et al., "AHG11: neural network based in-loop filter", Joint Video Experts Team (JVET) of ITU-T SG 16 WP 3 and ISO/IEC JTC 1/SC 29, JVET-W0113, Jul. 8, 2021 (Jul. 8, 2021).
Liqiang Wang et al., "AHG11: neural network based cross-component prediction model", Joint Video Experts Team (JVET) of ITU-T SG 16 WP 3 and ISO/IEC JTC 1/SC 29, JVET-W0111, Jul. 12, 2021 (Jul. 12, 2021).
The European Patent Office (EPO) The Extended European Search Report for Application No. 22874610.3 Dec. 12, 2024 15 Pages.
Weiyao Lin et al. "Partition-aware adaptive switching neural networks for post-processing in HEVC." IEEE Transactions on Multimedia 22.11 (2019): 2749-2763.
Yue Li et al., "AHG11: Deep In-Loop Filter with Adaptive Model Selection and External Attention", 23rd Meeting, by teleconference, Jul. 7-16, 2021, Joint Video Experts Team (JVET) of ITU-T SG 16 WP 3 and ISO/IEC JTC 1/SC 29.
Liqiang Wang et al., "AHG11: neural network based in-loop filter with adaptive model selection", 24th Meeting, by teleconference, Oct. 6-15, 2021, Joint Video Experts Team (JVET) of ITU-T SG 16 WP 3 and ISO/IEC JTC 1/SC 29.

* cited by examiner

FILTERING METHOD AND APPARATUS, COMPUTER-READABLE MEDIUM, AND ELECTRONIC DEVICE

RELATED APPLICATIONS

This application is a continuation of PCT Application No. PCT/CN2022/118321 filed on Sep. 13, 2022, which in turn claims priority to Chinese Patent Application No. 202111144705.7, entitled "FILTERING, encoding AND DECODING METHODS AND APPARATUSES, COMPUTER-READABLE MEDIUM, AND ELECTRONIC DEVICE" filed to the China National Intellectual Property Administration on Sep. 28, 2021. The two applications are incorporated by reference in their entirety.

FIELD OF THE TECHNOLOGY

This application relates to the technical field of computers and communication, and in particular to filtering, encoding and decoding methods and apparatuses, a computer-readable medium, and an electronic device.

BACKGROUND OF THE DISCLOSURE

In the field of video encoding and decoding, after a prediction image and a reconstructed residual image are superimposed to generate a reconstructed image, loop filtering is often applied on the reconstructed image to obtain an image with a better quality since the reconstructed image may be distorted. For the loop filtering, how to improve a filtering effect to improve encoding and decoding efficiency is a technical problem to be solved urgently.

SUMMARY

Embodiments of this application provide filtering, encoding and decoding methods and apparatuses, a computer-readable medium, and an electronic device, which can improve a filtering effect at least to a certain extent, and thus are advantageous for improving video encoding and decoding efficiency.

Other features and advantages of this application become obvious through the following detailed descriptions or partially learned through the practice of this application.

One aspect of the embodiments of this application provides a deep learning-based filtering method. The method includes obtaining a reconstructed image of luma component corresponding to an encoded image and chroma component information corresponding to the encoded image; generating an input parameter of a deep learning filter according to the reconstructed image of luma component and the chroma component information; and generating, based on the input parameter to the deep learning filter, a filtered image corresponding to the reconstructed image of luma component.

Another aspect of the embodiments of this application provides a video encoding method. The method includes obtaining a reconstructed image of luma component corresponding to an encoded image and chroma component information corresponding to the encoded image; generating an input parameter of a deep learning filter according to the reconstructed image of luma component and the chroma component information; inputting the input parameter to the deep learning filter to obtain a filtered image that is outputted by the deep learning filter and corresponds to the reconstructed image of luma component; and generating a prediction image of luma component corresponding to a next frame of image based on the filtered image, and encoding the next frame of video image based on the prediction image of luma component.

Another aspect of the embodiments of this application provides a non-transitory computer-readable medium is provided. The computer-readable medium stores a computer program which, when executed by a processor, implements the deep learning-based filtering method, the video encoding method or the video decoding method as described in the foregoing embodiments.

In some embodiments of this application, a reconstructed image of luma component corresponding to a encoded image and chroma component information corresponding to the encoded image are obtained, an input parameter of a deep learning filter is generated according to the reconstructed image of luma component and the chroma component information, and then the input parameter is inputted to the deep learning filter to obtain a filtered image that is outputted by the deep learning filter and corresponds to the reconstructed image of luma component. Therefore, when filtering a luma component of an image, information of the chroma component can be fully used. Furthermore, the existing chroma information can be used to improve the performance of the deep learning filter for the luma component, thereby improving a filtering effect and video encoding and decoding efficiency.

It is to be understood that both the foregoing general description and the following detailed description are exemplary and explanatory only and are not restrictive of this application.

BRIEF DESCRIPTION OF THE DRAWINGS

The accompanying drawings, which are incorporated in and constitute a part of this specification, illustrate embodiments consistent with this application and, together with the specification, serve to explain the principles of this application. It is obvious that the accompanying drawings in the following description are only some embodiments of this application, and those of ordinary skill in the art may also obtain other accompanying drawings according to these accompanying drawings without involving any inventive effort. In the accompanying drawings.

DESCRIPTION OF EMBODIMENTS

Embodiments consistent with the present disclosure will now be described in a more complete manner with reference to the accompanying drawings. However, the embodiments can be implemented in various forms and may not be construed as being limited to these examples. Rather, these embodiments are provided in order that this application will be more thorough and complete, and the concept of the example embodiments will be conveyed to those skilled in the art completely.

Furthermore, the features, structures, or characteristics described herein may be combined in any suitable manner in one or more embodiments. In the following description, numerous specific details are set forth in order to provide a thorough understanding of the embodiments of this application. However, those skilled in the art will recognize that not all of the specific details of the embodiments may be used, that one or more specific details may be omitted, or that other methods, elements, apparatuses, steps, and the like may be employed in practicing the technical solutions of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely descriptive. They do not need to include all content and operations/steps, and do not need to be performed in the described orders either. For example, some operations/steps may be further divided, while some operations/steps may be combined or partially combined. Therefore, an execution order may change according to a specific use case.

"A plurality" mentioned herein means two or more than two. "And/or" describes an association relationship between associated objects, and represents that three relationships may exist. For example, A and/or B may represent the following three cases: Only A exists, both A and B exist, and only B exists. The character "/" generally represents that contextual objects are in an "or" relationship.

Figure 1:
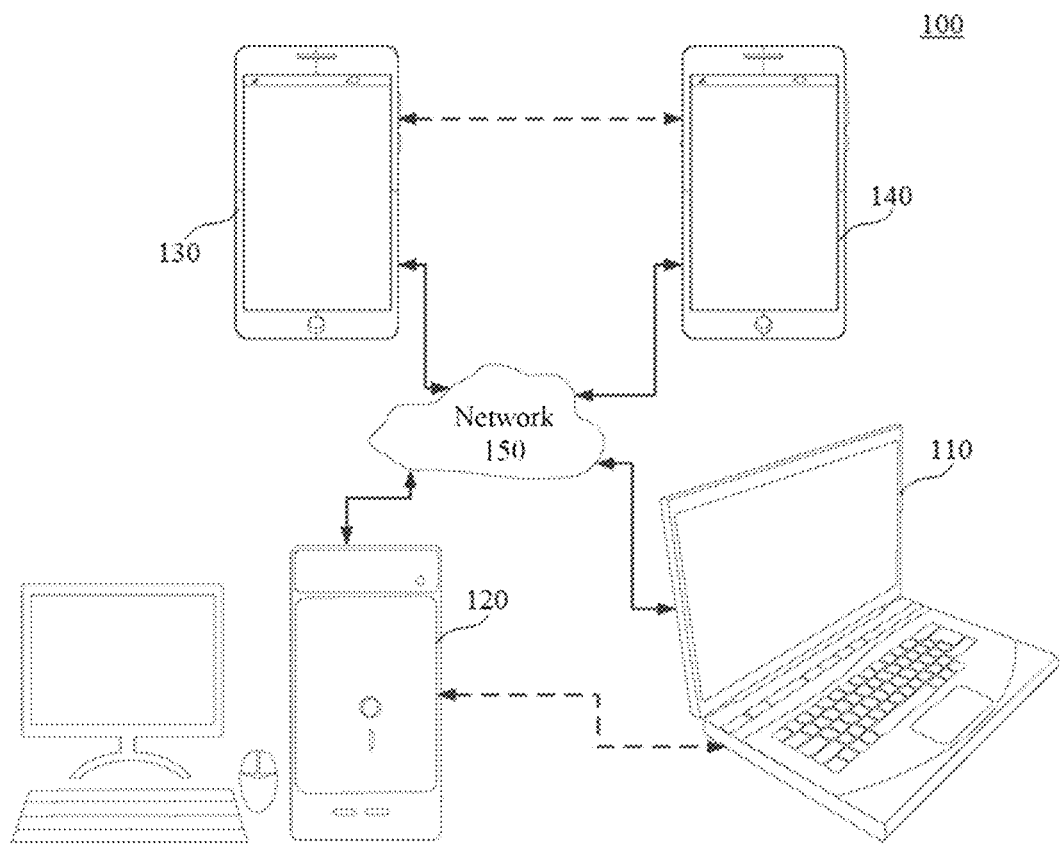
FIG. 1 shows a schematic diagram of a system architecture to which a technical solution according to one embodiment may be applied.

FIG. 1 shows a schematic diagram of a system architecture to which a technical solution according to one embodiment may be applied.

As shown in FIG. 1, system architecture 100 includes a plurality of terminal apparatuses. The terminal apparatuses may communicate with each other through, for example, a network 150. For example, the system architecture 100 may include a first terminal apparatus 110 and a second terminal apparatus 120 interconnected through network 150. In the embodiment of FIG. 1, the first terminal apparatus 110 and the second terminal apparatus 120 perform unidirectional data transmission.

For example, the first terminal apparatus 110 may encode video data (for example, a video picture stream acquired by the terminal apparatus 110) for transmission over the network 150 to the second terminal apparatus 120. The coded video data is transmitted in one or more coded video streams. The second terminal apparatus 120 may receive the coded video data from the network 150, decode the coded video data to restore the video data, and display a video picture according to the restored video data.

In one embodiment, the system architecture 100 may include a third terminal apparatus 130 and a fourth terminal apparatus 140 that perform bi-directional transmission of the coded video data. The bi-directional transmission may occur, for example, during a video conference. For bi-directional data transmission, each of the third terminal apparatus 130 and the fourth terminal apparatus 140 may encode video data (for example, a video picture stream acquired by the terminal apparatus) for transmission over the network 150 to the other of the third terminal apparatus 130 and the fourth terminal apparatus 140. Each of the third terminal apparatus 130 and the fourth terminal apparatus 140 may also receive the coded video data transmitted by the other of the third terminal apparatus 130 and the fourth terminal apparatus 140, may decode the coded video data to restore the video data, and may display a video picture on an accessible display apparatus according to the restored video data.

In the embodiment of FIG. 1, the first terminal apparatus 110, the second terminal apparatus 120, the third terminal apparatus 130, and the fourth terminal apparatus 140 may be a server, a personal computer and a smart phone, but the principles disclosed in this application may not be limited thereto. Embodiments disclosed in this application are applicable to laptop computers, tablet computers, media players, and/or dedicated video conferencing devices. The network 150 represents any number of networks that communicate the coded video data between the first terminal apparatus 110, the second terminal apparatus 120, the third terminal apparatus 130, and the fourth terminal apparatus 140, including, for example, wired and/or wireless communication networks. The communication network 150 may exchange data in circuit-switched and/or packet-switched channels. The network may include a telecommunications network, a local area network, a wide area network, and/or the Internet. For purposes of this application, unless explained below, the architecture and topology of network 150 may be insignificant to the operation disclosed in this application.

Figure 2:
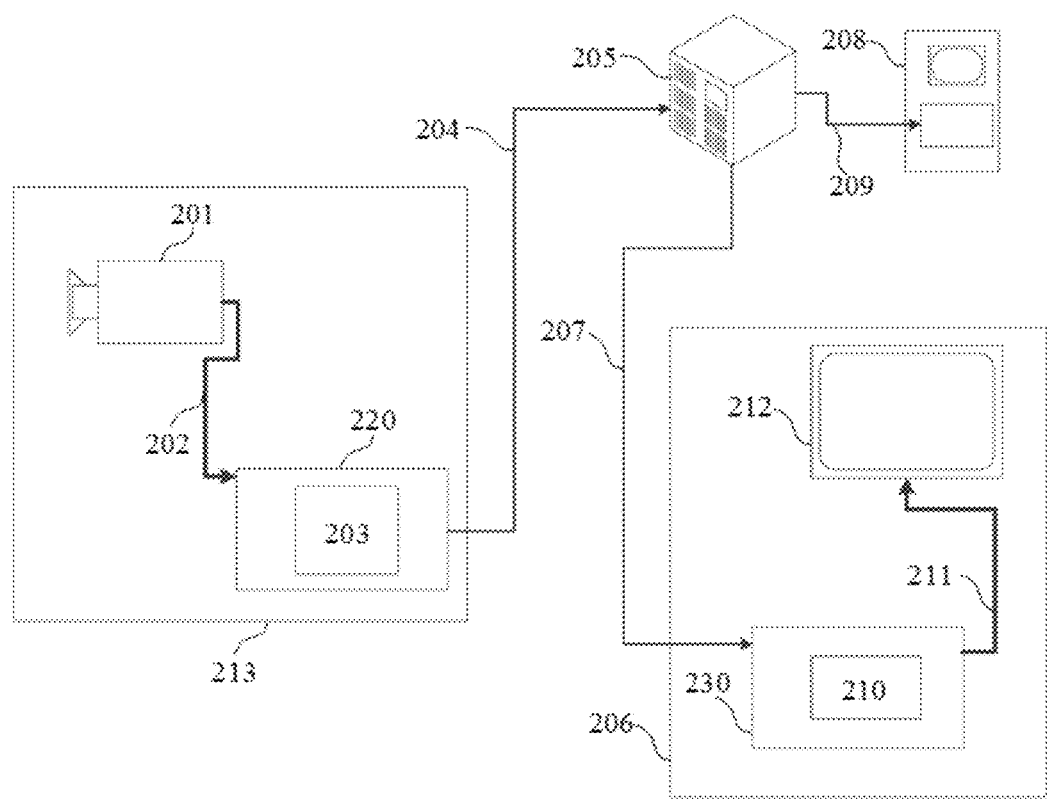
FIG. 2 shows a schematic diagram of placement modes of a video encoding apparatus and a video decoding apparatus in a streaming transmission system.

In one embodiment, FIG. 2 shows placement modes of a video encoding apparatus and a video decoding apparatus in a streaming transmission environment. The subject matter disclosed in this application is equally applicable to other video-enabled applications including, for example, video conferencing, digital television (TV), storing compressed video on digital media including CD, DVD, memory sticks, and the like.

A streaming transmission system may include an acquisition subsystem 213. The acquisition subsystem 213 may include a video source 201, such as a digital camera. The video source creates an uncompressed video picture stream 202. In an embodiment, video picture stream 202 includes samples taken by a digital camera. In contrast to coded video data 204 (or a coded video stream 204), the video picture stream 202 is depicted as a bold line to emphasize a high-data-volume video picture stream. The video picture stream 202 may be processed by an electronic apparatus 220. The electronic apparatus 220 includes a video encoding apparatus 203 coupled to the video source 201. Video encoding apparatus 203 may include hardware, software, or a combination of hardware and software to realize or implement aspects of the disclosed subject matter as described in more detail below. In contrast to the video picture stream 202, the coded video data 204 (or the coded video stream 204) is depicted as a thin line to emphasize low-data-volume coded video data 204 (or the coded video stream 204), which may be stored on a streaming transmission server 205 for future use. One or more streaming transmission client subsystems, such as a client subsystem 206 and a client subsystem 208 in FIG. 2, may access the streaming transmission server 205 to retrieve a copy 207 and a copy 209 of the coded video data 204. Client subsystem 206 may include, for example, the video decoding apparatus 210 in the electronic apparatus 230. The video decoding apparatus 210 decodes the copy 207 of the coded video data and generates an output video picture stream 211 that may be presented on a display 212 (for example, a display screen) or another presentation apparatus. In some streaming transmission systems, the coded video data 204, video data 207 and video data 209 (for example, video streams) may be coded according to certain video encoding/compression standards.

The electronic apparatus 220 and the electronic apparatus 230 may include other components not shown in the figures. For example, the electronic apparatus 220 may include a video decoding apparatus, and the electronic apparatus 230 may also include a video encoding apparatus.

In one embodiment, taking an international video encoding standard: High Efficiency Video encoding (HEVC), versatile video encoding (VVC) and a Chinese national video encoding standard AVS as examples, when a video frame image is inputted, the video frame image is divided into a number of non-overlapping processing units according to a block size, and each processing unit will perform a similar compression operation. This processing unit is referred to as an encoding tree unit (CTU) or a largest encoding unit (LCU). The CTU may then be more finely divided to obtain one or more coding units (CU). The CU is the most basic element of an encoding link.

Some concepts in encoding a CU are introduced below:

Predictive encoding: the predictive encoding includes intra-frame prediction, inter-frame prediction and other modes, and after an original video signal is predicted by a selected reconstructed video signal, a residual video signal is obtained. An encoder side needs to determine a corresponding predictive encoding mode for the current CU and to inform of a decoder side. The intra-frame prediction means that a predicted signal comes from a region which has been coded and reconstructed in the same image. The inter-frame prediction means that a predicted signal comes from an already encoded image (referred to as a reference image) different from a current image.

Transform & Quantization: after a residual video signal is subjected to transform operations such as discrete Fourier transform (DFT) and discrete cosine transform (DCT), the signal is converted into a transform domain, which is referred to as a transform coefficient. The transform coefficient is further subjected to a lossy quantization operation, and some information is lost, whereby a quantized signal is advantageous for compression expression. In some video encoding standards, there may be more than one selectable transform mode. Therefore, the encoder side also needs to select one of the transform modes for the current CU and inform of the decoder side. The degree of refinement of quantization is usually determined by a quantization parameter (QP). A larger value of the QP indicates that coefficients within a larger range of values will be quantized into the same output. Therefore, more distortion and lower code rate will be brought usually. Conversely, a smaller value of the QP indicates that coefficients within a smaller range of values will be quantized into the same output. Therefore, less distortion will be brought usually while corresponding to a higher code rate.

Entropy encoding or statistical encoding: a quantized transform domain signal will be statistically compressed and coded according to the frequency of occurrence of each value, and finally a binary (0 or 1) compressed stream will be output. Meanwhile, other information is generated by encoding. For example, a selected encoding mode, motion vector data, and the like also need to be subjected to entropy encoding to reduce the code rate. The statistical encoding is a lossless encoding mode, which can effectively reduce the code rate required to express the same signal. Common statistical encoding modes include variable length encoding (VLC) or context adaptive binary arithmetic encoding (CABAC).

The context adaptive binary arithmetic encoding (CABAC) process mainly includes three steps: binarization, context modeling, and binary arithmetic encoding. After an inputted syntax element is binarized, binary data may be coded through a normal encoding mode and a bypass encoding mode. The bypass encoding mode does not need to assign a specific probability model to each binary bit, and an inputted binary bit bin value is directly coded with a simple bypass coder to speed up the overall encoding and decoding. In general, different syntax elements are not completely independent, and the same syntax element has some memorability. Therefore, according to a conditional entropy theory, conditional encoding using other coded syntax elements can further improve encoding performance compared to independent encoding or memoryless encoding. These coded information used as conditions are called contexts. In the conventional encoding mode, binary bits of the syntax elements enter a context coder in sequence, and the coder assigns an appropriate probability model to each inputted binary bit according to the value of the previously coded syntax element or binary bit. The process is context modeling. A context model corresponding to the syntax element may be located through context index increment (ctxIdxInc) and context index start (ctxIdxStart). After the bin value and the assigned probability model are sent to a binary arithmetic coder for encoding, the context model needs to be updated according to the bin value. This is an adaptive process in encoding.

Loop filtering: a transformed and quantized signal is processed by inverse quantization, inverse transform, and predictive compensation to obtain a reconstructed image. The reconstructed image is different from an original image in part of the information due to the effect of quantization. That is, the reconstructed image is distorted. Therefore, the reconstructed image may be filtered by a deblocking filter (DB), a sample adaptive offset (SAO) filter, or an adaptive loop filter (ALF), and the like, thereby effectively reducing the degree of distortion generated by quantization. Since these filtered reconstructed images will be used as references for subsequent encoded images to predict future image signals, the foregoing filtering operation is also referred to as loop filtering, namely a filtering operation within an encoding loop.

Figure 3:
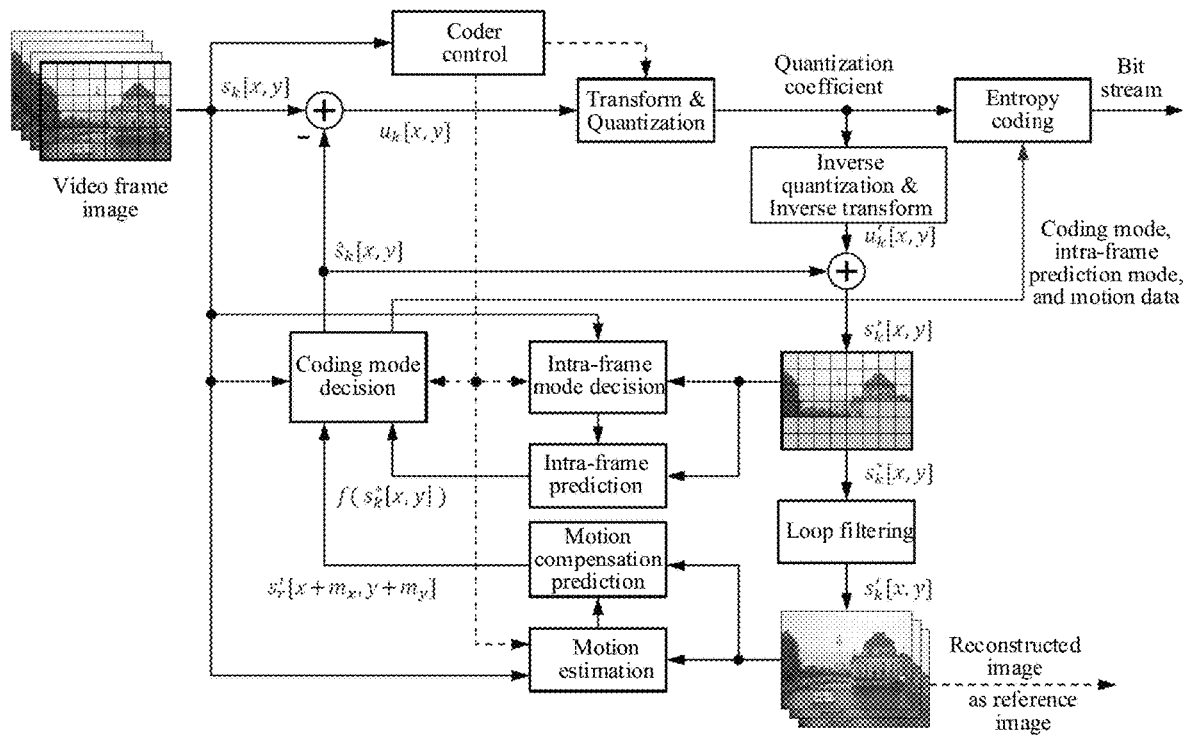
FIG. 3 shows a flowchart of a video coder.

In one embodiment, FIG. 3 shows a flowchart of a video coder. In this flow, intra-frame prediction is exemplified. A difference operation is performed on an original image signal $s_k[x, y]$ and a prediction image signal $\hat{s}_k[x, y]$ to obtain a residual signal $u_k[x, y]$. The residual signal $u_k[x, y]$ is transformed and quantized to obtain a quantization coefficient. The quantization coefficient, on the one hand, obtains a coded bit stream through entropy encoding, and on the other hand obtains a reconstructed residual signal $u'_k[x, y]$ through inverse quantization and inverse transform processing. The prediction image signal $\hat{s}_k[x, y]$ and the reconstructed residual signal $u'_k[x, y]$ are superimposed to generate a reconstructed image signal $s_k^*[x, y]$. The reconstructed image signal $s_k^*[x, y]$, on the one hand, is inputted to an intra-frame mode decision module and an intra-frame prediction module for intra-frame prediction processing, and filtered, on the other hand, through loop filtering to output a filtered image signal $s'_k[x, y]$. The filtered image signal $s'_k[x, y]$ may be used as a next frame of reference image for motion estimation and motion compensation prediction. Then, a next frame of prediction image signal $\hat{s}_k[x, y]$ is obtained based on a result s', $[x+m_x, y+m_y]$ of motion compensation prediction and a result $f(s_k^*[x, y])$ of intra-frame prediction, and the foregoing process is continuously repeated until the encoding is completed.

Figure 4:
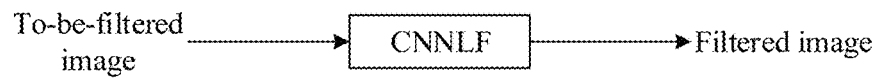
FIG. 4 shows a schematic diagram of CNNLF-based filtering processing.

The foregoing loop filtering may be implemented based on a convolutional neural network loop filter (CNNLF). A model structure of the CNNLF includes basic modules such as a convolutional layer, an activation function, a full connection layer, and a pooling layer. Model parameters need to be obtained through training. As shown in FIG. 4, after the CNNLF is trained, a to-be-filtered image may be input into the trained CNNLF, and finally a filtered image may be outputted.

Figure 5:
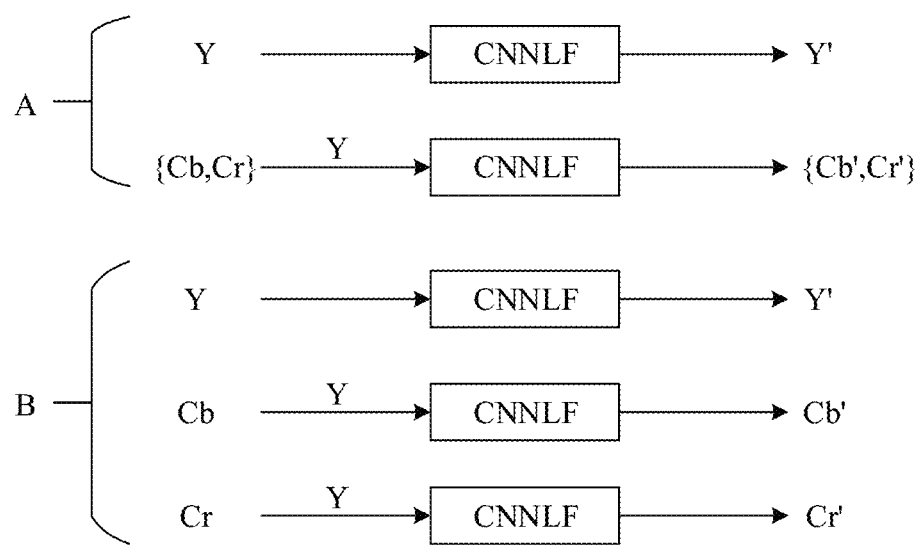
FIG. 5 shows a schematic diagram of filtering a luma component and a chroma component.

For an image filtering task, different filtering models may be trained separately for a luma component (Y) and chroma components (Cb and Cr) to improve the filtering performance for the luma component and the chroma components. For example, with regard to mode A shown in FIG. 5, the component Y and the component {Cb, Cr} may be filtered separately by two deep learning filters. Alternatively, as shown in mode B, the component Y, the component Cb, and the component Cr may be filtered separately by three deep learning filters. Regardless of mode A or mode B shown in FIG. 5, since the component Y contains more texture information, information of the component Y is often introduced when filtering the chroma components Cb and/or Cr to improve the classification accuracy of a filter, thereby improving the final filtering performance.

Figure 6:
FIG. 6 shows a schematic diagram of filtering a luma component according to one embodiment.

However, in order to improve the performance of a luma component filter, the embodiments of this application propose that existing information is used to improve the performance of the deep learning filter for the luma component. For example, as shown in FIG. 6, the information of the chroma component {Cb, Cr} may be used to improve the performance of the deep learning filter for the luma component Y. In this embodiment, the information of the chroma component may be one or more of a to-be-filtered image of chroma component (namely, chroma component reconstructed image), a prediction image of chroma component, and chroma component block partitioning information.

Deep learning belongs to the category of artificial intelligence (AI). Machine learning (ML) is the core of AI, is the fundamental way to make computers intelligent, and is applied in all fields of AI. The deep learning filter in the embodiments of this application is a machine learning/deep learning-based filter.

The implementation details of the embodiments of this application are described in detail as follows.

Figure 7:
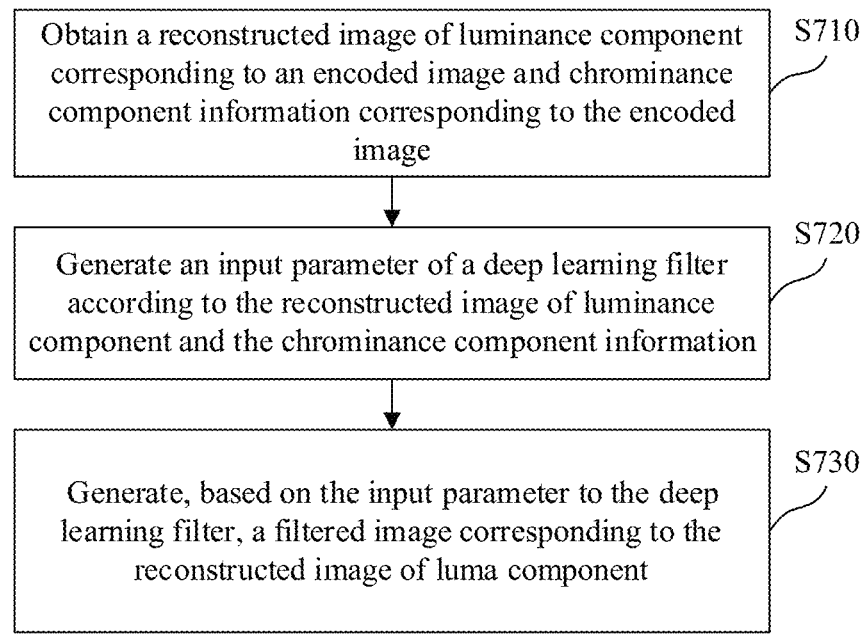
FIG. 7 shows a flowchart of a deep learning-based filtering method according to one embodiment.

FIG. 7 shows a flowchart of a deep learning-based filtering method according to one embodiment. The deep learning-based filtering method may be performed by a device having a processing function such as computing and storage. For example, the deep learning-based filtering method may be performed by a terminal device or a server. Referring to FIG. 7, the deep learning-based filtering method includes at least step S710 to step S730. A detailed description is as follows.

In step S710, a reconstructed image of luma component corresponding to an encoded image and chroma component information corresponding to the encoded image are obtained.

In one embodiment, the reconstructed image corresponding to the encoded image is an image generated by superimposing a reconstructed residual image obtained after inverse quantization and inverse transform processing and a prediction image. For example, in the flow shown in FIG. 3, the reconstructed image is an image signal $s_k^*[x, y]$ generated by superimposing a prediction image signal $\hat{s}_k[x, y]$ and a reconstructed residual signal $u'_k[x, y]$. The reconstructed image of luma component is a luma part in the reconstructed image corresponding to the encoded image.

In this embodiment, the chroma component information includes at least one of the following: information of a to-be-filtered image of chroma component corresponding to the encoded image, information of a prediction image of chroma component corresponding to the encoded image, and chroma component block partitioning information corresponding to the encoded image.

In this embodiment, the chroma component block partitioning information may be an image generated according to a chroma component block partitioning result, and for example, may include at least one of the following images: a binary image generated according to a chroma component block partitioning boundary; a binary image generated according to a filtering boundary of a deblocking filter for the chroma component reconstructed image; or a chroma component block partitioning average image obtained by averaging in the same block as values of all sample points within the block according to a block partitioning result for a to-be-filtered chroma component reconstructed image.

In step S720, an input parameter of a deep learning filter is generated according to the reconstructed image of luma component and the chroma component information.

In one embodiment, the chroma component information may be up-sampled to obtain chroma component information with the same size as that of the reconstructed image of luma component. Then layer combination is performed on the reconstructed image of luma component and the up-sampled chroma component information, and a result the layer combination is taken as the input parameter of the deep learning filter. In one embodiment, the reconstructed image of chroma component may be up-sampled to have a same size as that of the reconstructed image of luma component based on the chroma component information. Then layer combination is performed on the reconstructed image of luma component and the up-sampled reconstructed image of chroma component, and the input parameter of the deep learning filter is generated based on a result of the layer combination.

In this embodiment, the up-sampling may be implemented using an up-sampling filter or by a deep learning module. The up-sampling filter may be implemented, for example, based on Lanczos (algorithm that transforms a symmetric matrix into a symmetric tridiagonal matrix by orthogonal similarity transformation), nearest (nearest neighbor interpolation algorithm), bilinear (bilinear interpolation algorithm), bicubic (bicubic interpolation algorithm), and the like.

Figure 8A:
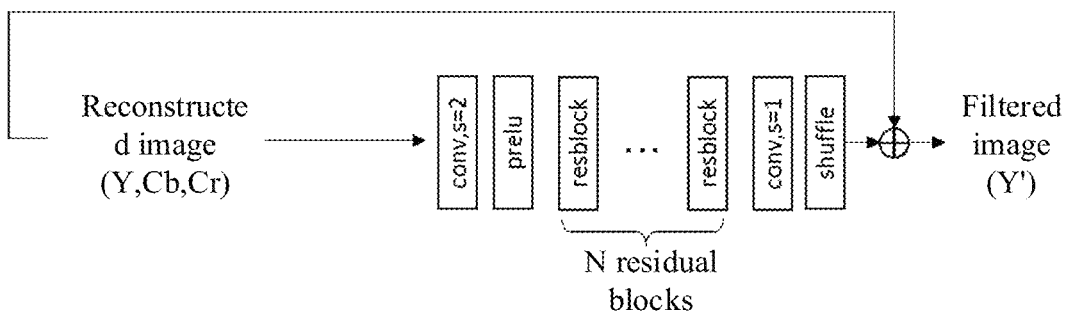
FIG. 8A shows a schematic diagram of generating an input parameter of a deep learning filter based on a reconstructed image of luma component and chroma component information according to one embodiment.

In one embodiment, the up-sampled chroma component information may be a chroma component reconstructed image. As shown in FIG. 8A, the reconstructed image of luma component (namely, the component Y) and the up-sampled chroma component reconstructed image (namely, the components Cb and Cr) may be respectively combined as a layer, and then inputted into the deep learning filter. Finally, a luma component filtered image Y' is obtained.

In this embodiment, the deep learning filter includes a convolutional unit, a residual unit, and a shuffle unit connected in sequence. The convolutional unit includes a convolutional layer (cony) and a parametric rectified linear unit (prelu). The residual unit includes N residual blocks connected in sequence. The shuffle unit is a shuffle unit. The shuffle unit is capable of performing a shuffle ( ) function to shuffle elements in an array in a random order, where the image is up-sampled by shuffling. In the embodiment shown in FIG. 8A, the convolutional layer in the convolutional unit preceding the residual unit has a step size s=2. Another convolutional layer may also be disposed between the residual unit and the shuffle unit. This convolutional layer has a step size s=1.

Figure 8B:
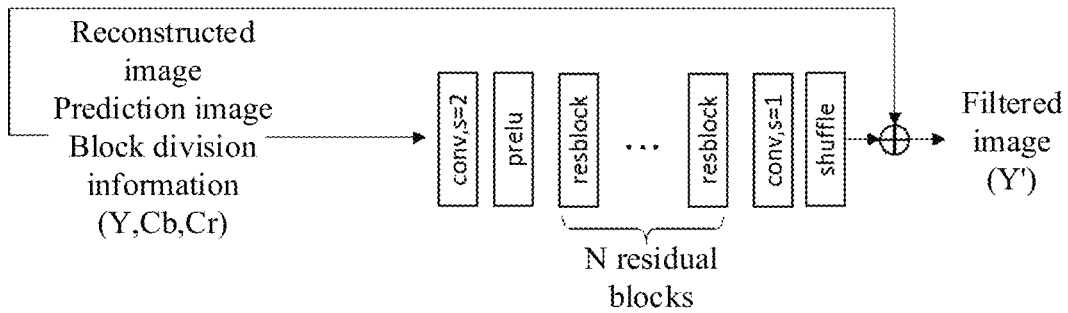
FIG. 8B shows a schematic diagram of generating an input parameter of a deep learning filter based on a reconstructed image of luma component and chroma component information according to another embodiment of this application.

In one embodiment, the up-sampled chroma component information may be a chroma component reconstructed image, a prediction image of chroma component, and chroma component block partitioning information. As shown in FIG. 8B, the reconstructed image of luma component, the prediction image of luma component, the luma component block partitioning information (namely, the component Y), the up-sampled chroma component reconstructed image, the prediction image of chroma component, and the chroma component block partitioning information (namely, the components Cb and Cr) may be respectively combined as a layer, and then inputted into the deep learning filter. Finally, a luma component filtered image Y' is obtained.

In this embodiment, the deep learning filter includes a convolutional unit, a residual unit, and a shuffle unit connected in sequence. The convolutional unit includes a convolutional layer cony and a parametric rectified linear unit prelu. The residual unit includes N residual blocks connected in sequence. The shuffle unit is a shuffle unit. In the embodiment shown in FIG. 8B, the convolutional layer in the convolutional unit preceding the residual unit has a step size s=2. Another convolutional layer may also be disposed between the residual unit and the shuffle unit. This convolutional layer has a step size s=1.

Similar to the chroma component block partitioning information, the luma component block partitioning information in the embodiments of this application may be an image generated according to a luma component block partitioning result, and for example, may include at least one of the following images: a binary image generated according to a luma component block partitioning boundary; a binary image generated according to a filtering boundary of a deblocking filter for the reconstructed image of luma component; or a luma component block partitioning average image obtained by averaging in the same block as values of all sample points within the block according to a block partitioning result for a to-be-filtered reconstructed image of luma component.

In one embodiment, the chroma component information may be up-sampled to obtain chroma component information with the same size as that of the reconstructed image of luma component. For example, the reconstructed image of chroma component can be up-sampled to have a same size as that of the reconstructed image of luma component based on the chroma component information. The chroma component information includes: a to-be-filtered image of chroma component, a prediction image of chroma component, and chroma component block partitioning information. Then the reconstructed image of luma component and the up-sampled to-be-filtered image of chroma component are combined to generate a first combined image, and a feature of the first combined image is extracted to obtain a first feature. The prediction image of luma component corresponding to the encoded image and the up-sampled prediction image of chroma component are combined to generate a second combined image, and a feature of the second combined image is extracted to obtain a second feature. The luma component block partitioning information corresponding to the encoded image and the up-sampled chroma component block partitioning information are combined to generate a third combined image, and a feature of the third combined image is extracted to obtain a third feature. Then the input parameter of the deep learning filter is generated according to the first feature, the second feature, and the third feature.

Figure 9:
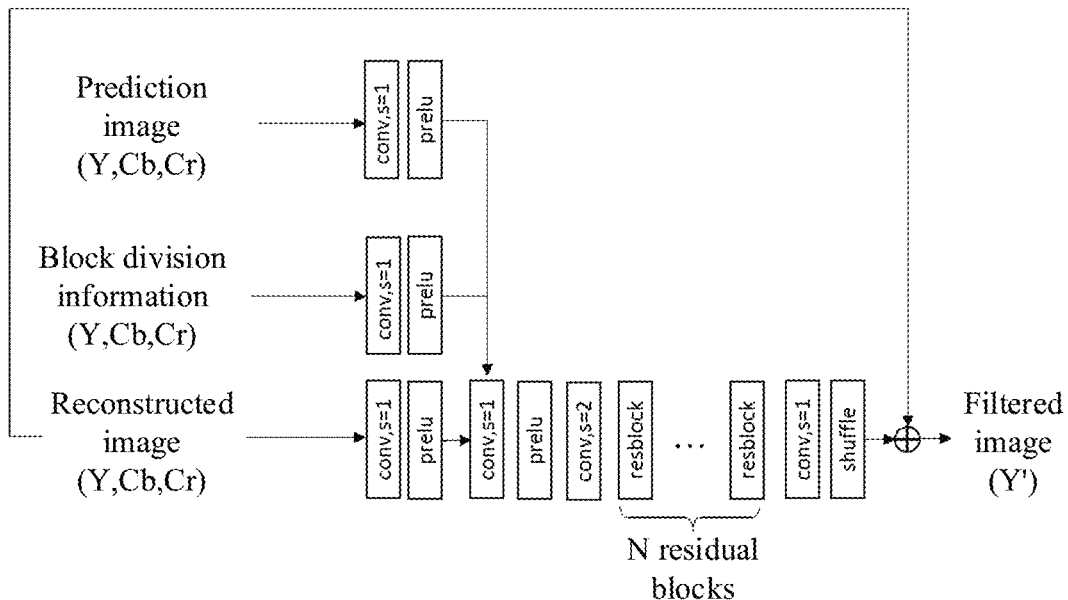
FIG. 9 shows a schematic diagram of generating an input parameter of a deep learning filter based on a reconstructed image of luma component and chroma component information according to another embodiment of this application.

Specifically, as shown in FIG. 9, after the prediction image of luma component and the up-sampled prediction image of chroma component are combined, features may be extracted by a convolutional unit (the convolutional unit includes a convolutional layer cony and a parametric rectified linear unit prelu, where the convolutional layer has a step size s=1). After the luma component block partitioning information and the up-sampled chroma component block partitioning information are combined, features may be extracted by a convolutional unit (the convolutional unit includes a convolutional layer cony and a parametric rectified linear unit prelu, where the convolutional layer has a step size s=1). After the reconstructed image of luma component and the up-sampled chroma component reconstructed image are combined, features may be extracted by a convolutional unit (the convolutional unit includes a convolutional layer cony and a parametric rectified linear unit prelu, where the convolutional layer has a step size s=1). Then these features are inputted into the deep learning filter, and finally a luma component filtered image Y' is obtained.

In the embodiment shown in FIG. 9, the deep learning filter includes a convolutional unit, a residual unit, and a shuffle unit connected in sequence. The convolutional unit includes a convolutional layer with a step size s=1, a parametric rectified linear unit prelu, and a convolutional layer with a step size s=2. The residual unit includes N residual blocks connected in sequence. The shuffle unit is a shuffle unit. In the embodiment shown in FIG. 9, a convolutional layer may also be disposed between the residual unit and the shuffle unit. This convolutional layer has a step size s=1.

In the embodiment shown in FIG. 9, the chroma component information includes, for example, a to-be-filtered image of chroma component (namely, chroma component reconstructed image), a prediction image of chroma component, and chroma component block partitioning information. In other embodiments of this application, the chroma component information may also include portions of a to-be-filtered image of chroma component (namely, chroma component reconstructed image), a prediction image of chroma component, and chroma component block partitioning information. If the chroma component information does not include the prediction image of chroma component, the embodiment shown in FIG. 9 may remove the part of feature extraction performed on a prediction image (Y, Cb, Cr) by the convolutional unit. If the chroma component information does not include the chroma component block partitioning information, the embodiment shown in FIG. 9 may remove the part of feature extraction performed on block partitioning information (Y, Cb, Cr) by the convolutional unit.

In one embodiment, the N residual blocks included in the residual unit may be any positive integer number (such as 1, 2, or 3) of residual blocks.

Figure 10:
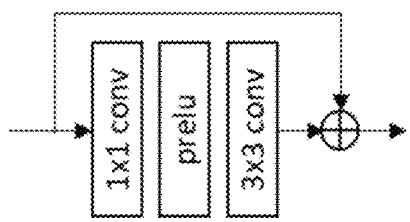
FIG. 10 shows a schematic structural diagram of a residual block according to one embodiment.

As shown in FIG. 10, the residual block in one embodiment may structurally include: a first convolutional layer (with a convolution kernel size 1×1), a parametric rectified linear unit, and a second convolutional layer (with a convolution kernel size 3×3) connected in sequence. A block input of the residual block is a layer input of the first convolutional layer, and a layer output of the second convolutional layer is superimposed with the layer input of the first convolutional layer to generate a block output of the residual block.

Figure 11:
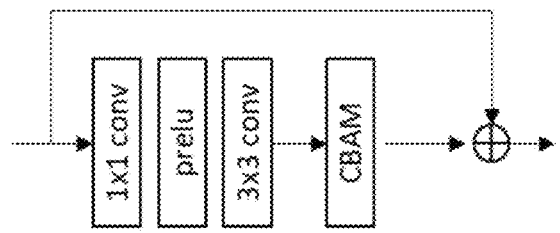
FIG. 11 shows a schematic structural diagram of a residual block according to another embodiment of this application.

As shown in FIG. 11, the residual block in one embodiment may structurally include: a first convolutional layer (with a convolution kernel size 1×1), a parametric rectified linear unit, a second convolutional layer (with a convolution kernel size 3×3), and a convolutional block attention module (CBAM) connected in sequence. A block input of the residual block is a layer input of the first convolutional layer, and a module output of the convolutional block attention module is superimposed with the layer input of the first convolutional layer to generate a block output of the residual block.

Figure 12:
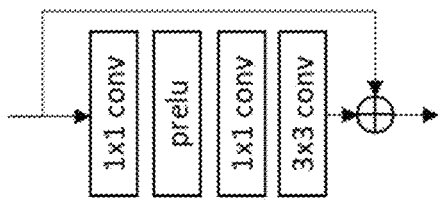
FIG. 12 shows a schematic structural diagram of a residual block according to another embodiment of this application.

As shown in FIG. 12, the residual block in one embodiment may structurally include: a first convolutional layer (with a convolution kernel size 1×1), a parametric rectified linear unit, a third convolutional layer (with a convolution kernel size 1×1), and a second convolutional layer (with a convolution kernel size 3×3) connected in sequence. A convolution kernel of the first convolutional layer has a same size as a convolution kernel of the third convolutional layer, a block input of the residual block is a layer input of the first convolutional layer, and a layer output of the second convolutional layer is superimposed with the layer input of the first convolutional layer to generate a block output of the residual block.

Figure 13:
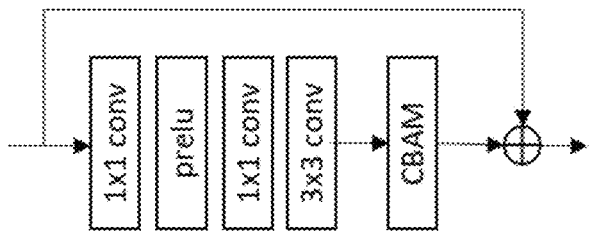
FIG. 13 shows a schematic structural diagram of a residual block according to another embodiment of this application.

As shown in FIG. 13, the residual block in one embodiment may structurally include: a first convolutional layer (with a convolution kernel size 1×1), a parametric rectified linear unit, a third convolutional layer (with a convolution kernel size 1×1), a second convolutional layer (with a convolution kernel size 3×3), and a convolutional block attention module connected in sequence. A convolution kernel of the first convolutional layer has a same size as a convolution kernel of the third convolutional layer, a block input of the residual block is a layer input of the first convolutional layer, and a module output of the convolutional block attention module is superimposed with the layer input of the first convolutional layer to generate a block output of the residual block In one embodiment, one or more residual blocks may be included in the residual unit, and each residual block may adopt any one of the foregoing structures. The number of convolutional layers and prelu layers included in the convolutional unit of the deep learning filter may be set according to specific requirements, and the number of convolutional layers and prelu layers included in the residual block may also be set according to specific requirements. Meanwhile, the number of channels of different convolutional layers may or may not be the same.

In step S730, based on the input parameter to the deep learning filter, a filtered image corresponding to the reconstructed image of luma component is generated. In other words, the generated input parameter is inputted to the deep learning filter to obtain a filtered image that is outputted by the deep learning filter and corresponds to the reconstructed image of luma component.

In one embodiment, the same parameter as that in applications is used as an input when the deep learning filter is trained. Specifically, in the training stage, a sample reconstructed image of a luma component and corresponding chroma component information (the chroma component information is adjusted according to a use scenario of the deep learning filter, namely, matching a parameter used by the deep learning filter when used) need to be obtained. Then an input parameter for training is generated according to the sample reconstructed image of the luma component and the chroma component information, and then the obtained input parameter is inputted into the deep learning filter. The parameters of the deep learning filter are adjusted according to a loss value between an output of the deep learning filter and an expected filtering result image corresponding to the sample reconstructed image of the luma component, and the process is repeated until the deep learning filter satisfies a convergence condition.

Figure 14:
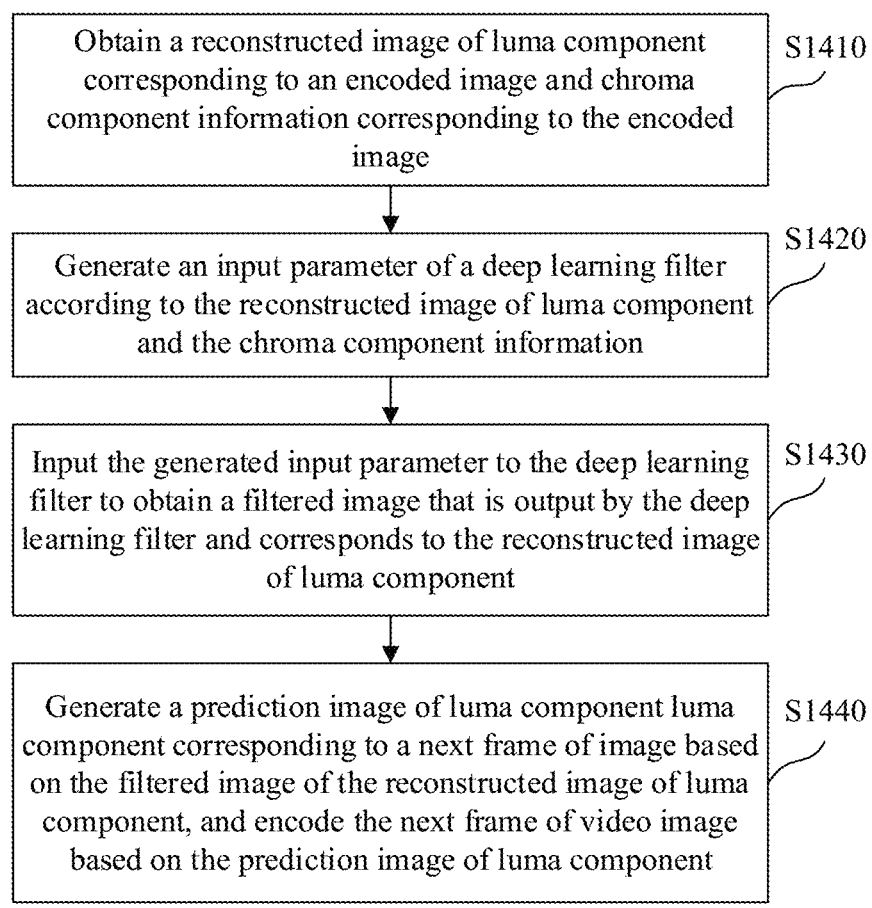
FIG. 14 shows a flowchart of a video encoding method according to one embodiment.

On the basis of the deep learning-based filtering method shown in FIG. 7, a video encoding method is also provided in the embodiments of this application. The video encoding method may be performed by a device having a processing function such as computing and storage. For example, the video encoding method may be performed by a terminal device or a server. The specific flow is shown in FIG. 14, and includes the following steps S1410 to S1440.

In step S1410, a reconstructed image of luma component corresponding to an encoded image and chroma component information corresponding to the encoded image are obtained.

Specific details of this step may be referred to in the foregoing step S710 and will not be described again.

In step S1420, an input parameter of a deep learning filter is generated according to the reconstructed image of luma component and the chroma component information.

Specific details of this step may be referred to in the foregoing step S720 and will not be described again.

In step S1430, the generated input parameter is inputted to the deep learning filter to obtain a filtered image that is output by the deep learning filter and corresponds to the reconstructed image of luma component.

In step S1440, a prediction image of luma component corresponding to a next frame of image is generated based on the filtered image of the reconstructed image of luma component, and the next frame of video image is coded based on the prediction image of luma component.

In this embodiment, after the filtered image is generated, reference may be made to the flow shown in FIG. 3. That is, the filtered image of the reconstructed image of luma component is used as a luma component reference image of a next frame of image to perform motion estimation and motion compensation prediction. Then a prediction image of luma component of the next frame of image is obtained based on a result of motion compensation prediction and a result of intra-frame prediction, and the flow shown in FIG. 3 continues to be repeated until encoding of a video image is completed.

Figure 15:
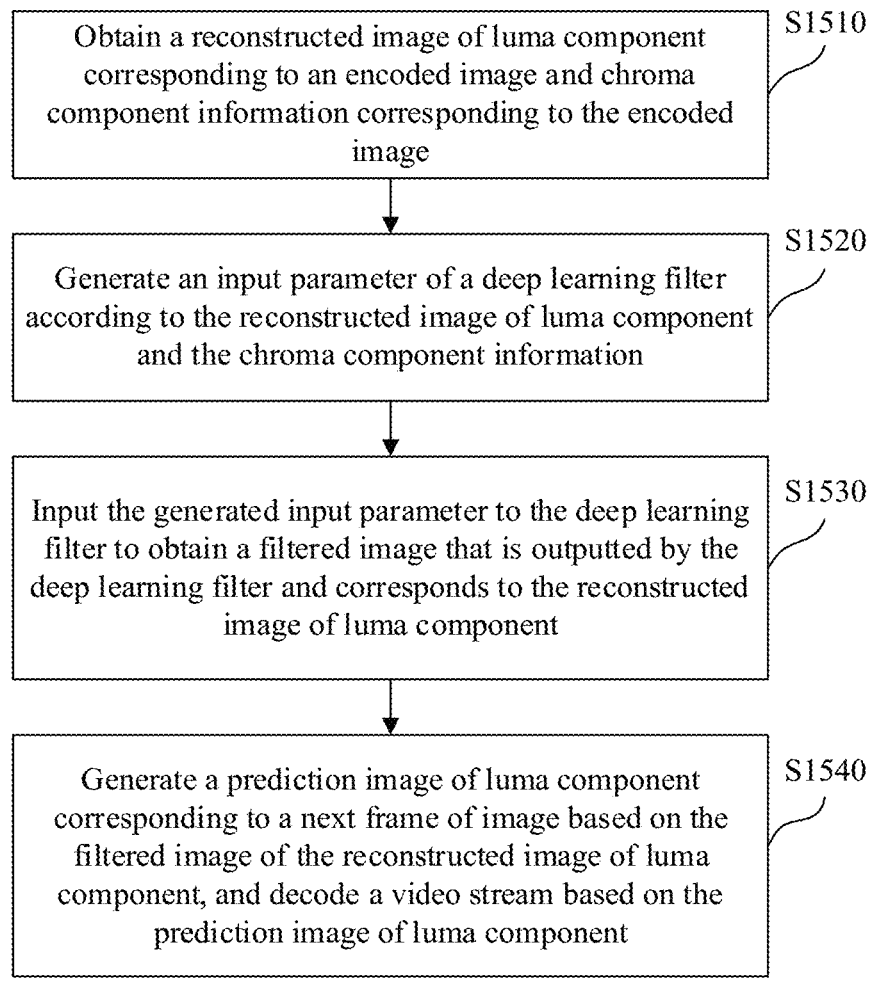
FIG. 15 shows a flowchart of a video decoding method according to one embodiment.

Accordingly, on the basis of the deep learning-based filtering method shown in FIG. 7, a video decoding method is also provided in the embodiments of this application. The video decoding method may be performed by a device having a processing function such as computing and storage. For example, the video decoding method may be performed by a terminal device or a server. The specific flow is shown in FIG. 15, and includes the following steps S1510 to S1540.

In step S1510, a reconstructed image of luma component corresponding to an encoded image and chroma component information corresponding to the encoded image are obtained.

Specific details of this step may be referred to in the foregoing step S710 and will not be described again.

In step S1520, an input parameter of a deep learning filter is generated according to the reconstructed image of luma component and the chroma component information.

Specific details of this step may be referred to in the foregoing step S720 and will not be described again.

In step S1530, the generated input parameter is inputted to the deep learning filter to obtain a filtered image that is outputted by the deep learning filter and corresponds to the reconstructed image of luma component.

In step S1540, a prediction image of luma component corresponding to a next frame of image is generated based on the filtered image of the reconstructed image of luma component, and a video stream is decoded based on the prediction image of luma component.

In this embodiment, after a filtered image of a reconstructed image of luma component is generated, motion estimation and motion compensation prediction may be performed on the filtered image of the reconstructed image of luma component as a next frame of luma component reference image. Then a prediction image of luma component of a next frame of image is obtained based on a result of motion compensation prediction and a result of intra-frame prediction. The prediction image of luma component is superimposed again with a luma component reconstructed residual signal obtained by performing inverse quantization and inverse transform processing to generate a next frame of reconstructed image of luma component, and this process is repeated to realize the decoding processing of a video stream.

In some embodiments of this application, when filtering a luma component of an image, information of the chroma component can be fully used. Furthermore, the existing chroma information can be used to improve the performance of the deep learning filter for the luma component, thereby improving a filtering effect and being advantageous for improving video encoding and decoding efficiency.

The following describes apparatus embodiments of this application that may be used to perform the deep learning-based filtering method according to the foregoing embodiments of this application. For details not disclosed in the apparatus embodiments of this application, reference is made to the embodiments of the foregoing deep learning-based filtering method according to this application.

Figure 16:
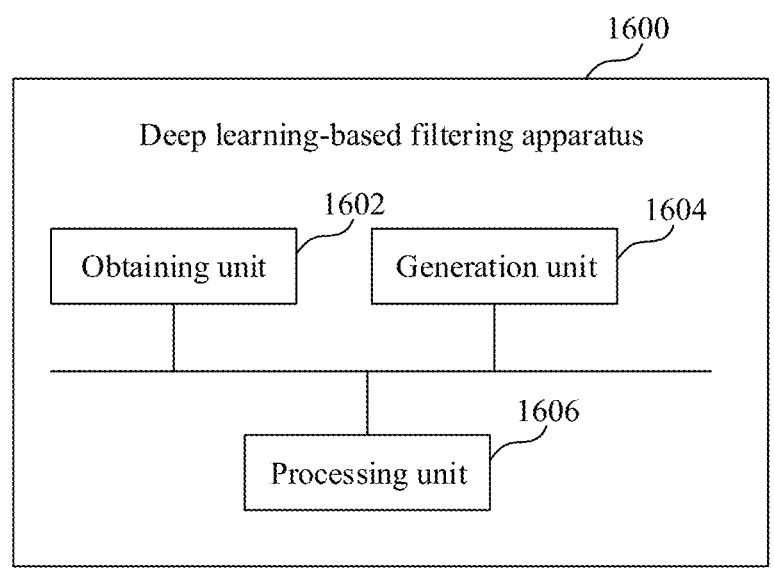
FIG. 16 shows a block diagram of a deep learning-based filtering apparatus according to one embodiment.

FIG. 16 shows a block diagram of a deep learning-based filtering apparatus according to one embodiment. The deep learning-based filtering apparatus may be disposed in a device having a processing function such as computing and storage. For example, the deep learning-based filtering apparatus may be disposed in a terminal device or a server.

Referring to FIG. 16, a deep learning-based filtering apparatus 1600 according to one embodiment includes: an obtaining unit 1602, a generation unit 1604, and a processing unit 1606.

The obtaining unit 1602 is configured to obtain a reconstructed image of luma component corresponding to an encoded image and chroma component information corresponding to the encoded image. The generation unit 1604 is configured to generate an input parameter of a deep learning filter according to the reconstructed image of luma component and the chroma component information. The processing unit 1606 is configured to input the input parameter to the deep learning filter to obtain a filtered image that is outputted by the deep learning filter and corresponds to the reconstructed image of luma component.

In some embodiments of this application, based on the foregoing solution, the chroma component information includes at least one of the following: a to-be-filtered image of chroma component corresponding to the encoded image, a prediction image of chroma component corresponding to the encoded image, and chroma component block partitioning information corresponding to the encoded image.

In some embodiments of this application, based on the foregoing solution, the generation unit 1604 is configured to: up-sample the chroma component information to obtain chroma component information with the same size as that of the reconstructed image of luma component; and perform layer combination on the reconstructed image of luma component and the up-sampled chroma component information, and take a result of the layer combination as the input parameter of the deep learning filter.

In some embodiments of this application, based on the foregoing solution, the generation unit 1604 is configured to: up-sample the chroma component information to obtain chroma component information with the same size as that of the reconstructed image of luma component, the chroma component information including: a to-be-filtered image of chroma component, a prediction image of chroma component, and chroma component block partitioning information; combine the reconstructed image of luma component and the up-sampled to-be-filtered image of chroma component, and extract a feature of a combined image to obtain a first feature; combine the prediction image of luma component corresponding to the encoded image and the up-sampled prediction image of chroma component, and extract a feature of a combined image to obtain a second feature; combine the luma component block partitioning information corresponding to the encoded image and the up-sampled chroma component block partitioning information, and extract a feature of a combined image to obtain a third feature; and generate the input parameter according to the first feature, the second feature, and the third feature.

In some embodiments of this application, based on the foregoing solution, the deep learning filter includes a convolutional unit, a residual unit, and a shuffle unit connected in sequence. The residual unit includes at least one residual block.

In some embodiments of this application, based on the foregoing solution, if the residual unit includes a plurality of residual blocks, the number of channels of the plurality of residual blocks is the same, or the number of channels of each of the residual blocks is not exactly the same.

In some embodiments of this application, based on the foregoing solution, one of the residual blocks includes: a first convolutional layer, a parametric rectified linear unit, and a second convolutional layer connected in sequence. An input of the first convolutional layer is taken as an input of the residual block, and a superimposition result of the input of the first convolutional layer and an output of the second convolutional layer is taken as an output of the residual block.

In some embodiments of this application, based on the foregoing solution, one of the residual blocks includes: a first convolutional layer, a parametric rectified linear unit, a second convolutional layer, and a convolutional block attention module connected in sequence. An input of the first convolutional layer is taken as an input of the residual block, and a superimposition result of the input of the first convolutional layer and an output of the convolutional block attention module is taken as an output of the residual block.

In some embodiments of this application, based on the foregoing solution, one of the residual blocks includes: a first convolutional layer, a parametric rectified linear unit, a third convolutional layer, and a second convolutional layer connected in sequence. A convolution kernel of the first convolutional layer has the same size as a convolution kernel of the third convolutional layer, an input of the first convolutional layer is taken as an input of the residual block, and a superimposition result of the input of the first convolutional layer and an output of the second convolutional layer is taken as an output of the residual block.

In some embodiments of this application, based on the foregoing solution, one of the residual blocks includes: a first convolutional layer, a parametric rectified linear unit, a third convolutional layer, a second convolutional layer, and a convolutional block attention module connected in sequence. A convolution kernel of the first convolutional layer has the same size as a convolution kernel of the third convolutional layer, an input of the first convolutional layer is taken as an input of the residual block, and a superimposition result of the input of the first convolutional layer and an output of the convolutional block attention module is taken as an output of the residual block.

Figure 17:
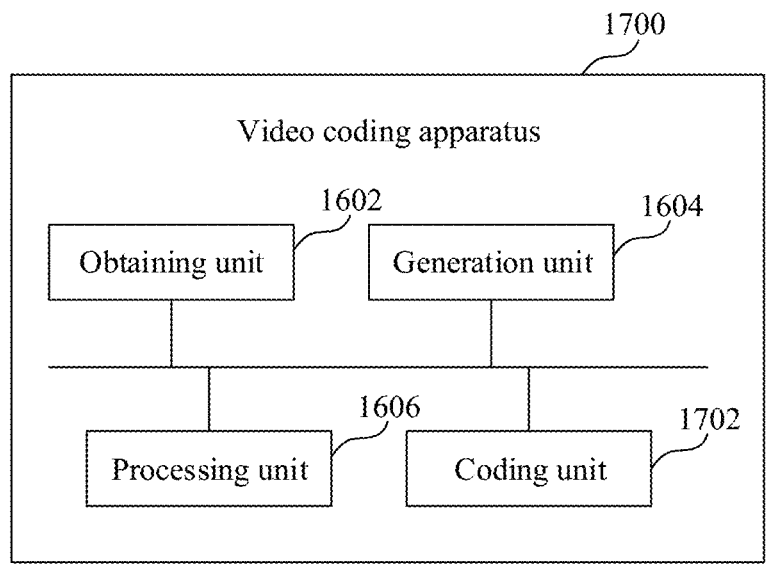
FIG. 17 shows a block diagram of a video encoding apparatus according to one embodiment.

FIG. 17 shows a block diagram of a video encoding apparatus according to one embodiment. The video encoding apparatus may be disposed in a device having a processing function such as computing and storage. For example, the video encoding apparatus may be disposed in a terminal device or a server.

Referring to FIG. 17, a video encoding apparatus 1700 according to one embodiment includes: an obtaining unit 1602, a generation unit 1604, a processing unit 1606, and an encoding unit 1702.

The obtaining unit 1602 is configured to obtain a reconstructed image of luma component corresponding to an encoded image and chroma component information corresponding to the encoded image. The generation unit 1604 is configured to generate an input parameter of a deep learning filter according to the reconstructed image of luma component and the chroma component information. The processing unit 1606 is configured to input the input parameter to the deep learning filter to obtain a filtered image that is outputted by the deep learning filter and corresponds to the reconstructed image of luma component. The encoding unit 1702 is configured to generate a prediction image of luma component corresponding to a next frame of image based on the filtered image, and encode the next frame of video image based on the prediction image of luma component.

Figure 18:
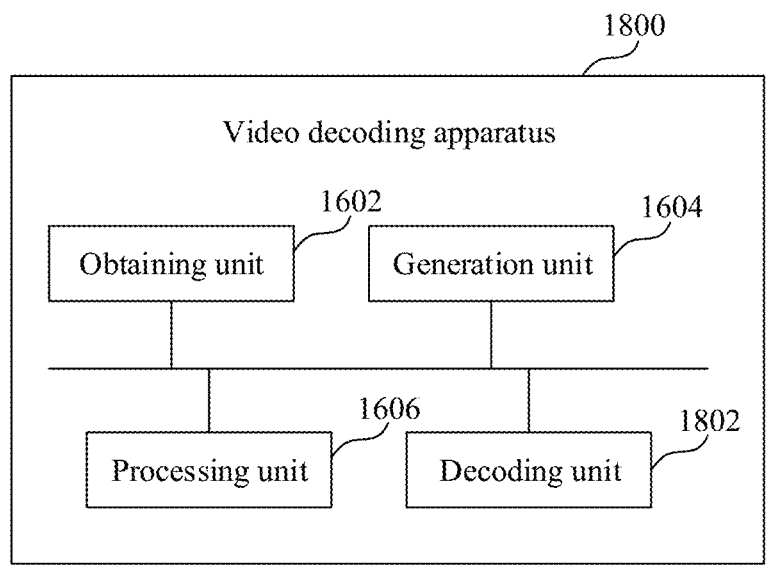
FIG. 18 shows a block diagram of a video decoding apparatus according to one embodiment.

FIG. 18 shows a block diagram of a video decoding apparatus according to one embodiment. The video decoding apparatus may be disposed in a device having a processing function such as computing and storage. For example, the video decoding apparatus may be disposed of in a terminal device or a server.

Referring to FIG. 18, a video decoding apparatus 1800 according to one embodiment includes: an obtaining unit 1602, a generation unit 1604, a processing unit 1606, and a decoding unit 1802.

The obtaining unit 1602 is configured to obtain a reconstructed image of luma component corresponding to an encoded image and chroma component information corresponding to the encoded image. The generation unit 1604 is configured to generate an input parameter of a deep learning filter according to the reconstructed image of luma component and the chroma component information. The processing unit 1606 is configured to input the input parameter to the deep learning filter to obtain a filtered image that is outputted by the deep learning filter and corresponds to the reconstructed image of luma component. The decoding unit 1802 is configured to generate a prediction image of luma component corresponding to a next frame of image based on the filtered image, and decode a video stream based on the prediction image of luma component.

Figure 19:
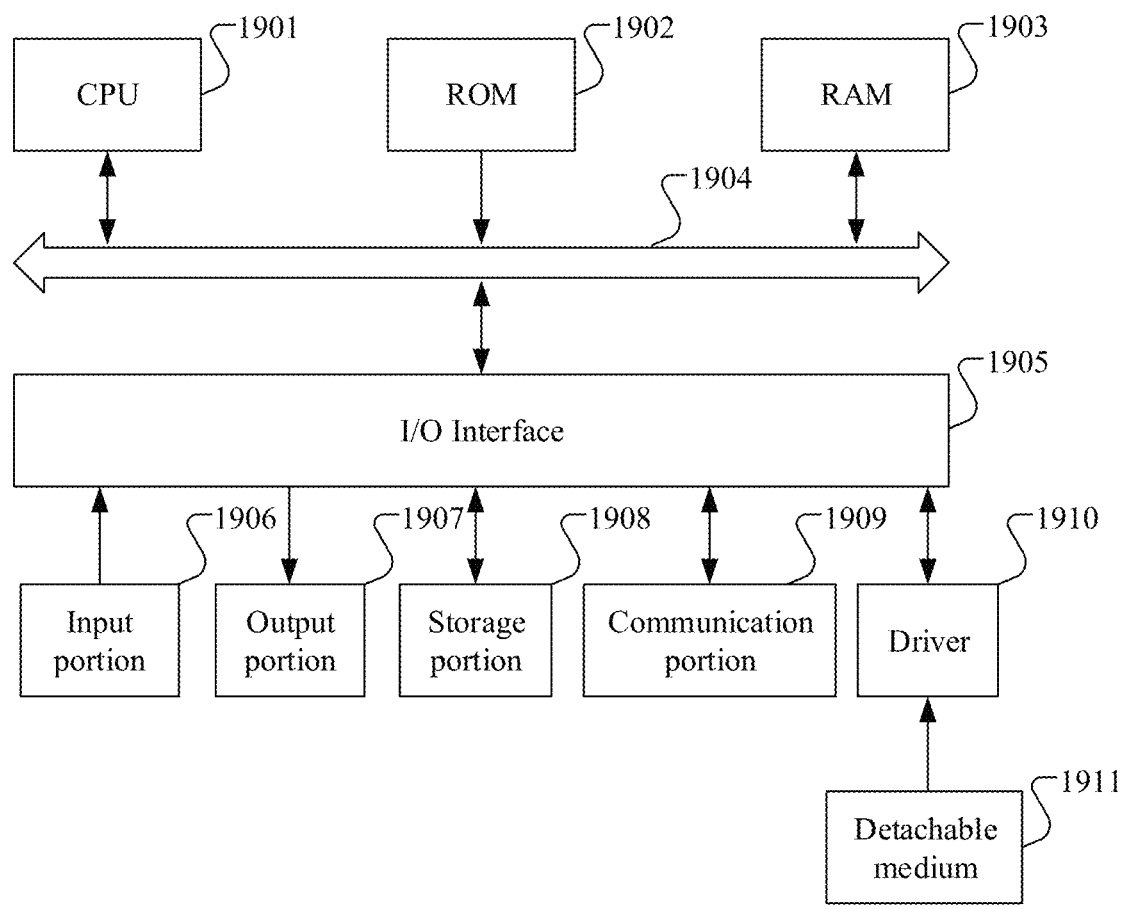
FIG. 19 is a schematic structural diagram of a computer system adapted to implement an electronic device according to one embodiment.

FIG. 19 is a schematic structural diagram of a computer system adapted to implement an electronic device according to one embodiment.

A computer system 1900 of an electronic device shown in FIG. 19 is merely an example and may not pose any limitation on the scope of functionality or use of the embodiments of this application.

As shown in FIG. 19, the computer system 1900 includes a central processing unit (CPU) 1901, which may perform various suitable actions and processing based on a program stored in a read-only memory (ROM) 1902 or a program loaded from a storage part 1908 into a random access memory (RAM) 1903, for example, perform the method described in the foregoing embodiments. In RAM 1903, various programs and data required for system operation are also stored. The CPU 1901, the ROM 1902, and the RAM 1903 are connected to each other through a bus 1904. An input/output (I/O) interface 1905 is also connected to the bus 1904.

The following components are connected to the I/O interface 1905: an input portion 1906 including a keyboard, a mouse, and the like; an output portion 1907 including, for example, a cathode ray tube (CRT), a liquid crystal display (LCD), a speaker, and the like; a storage portion 1908 including a hard disk, and the like; and a communication portion 1909 including, for example, a network interface card such as a local area network (LAN) card and a modem. The communication part 1909 performs communication processing by using a network such as the Internet. A driver 1910 is also connected to the I/O interface 1905 as required. A detachable medium 1911, such as a magnetic disk, an optical disk, a magneto-optical disk, or a semiconductor memory, is installed on the driver 1910 as needed so that a computer program read therefrom is installed into the storage portion 1908 as required.

Particularly, according to one embodiment, the processes described in the following by referring to the flowcharts may be implemented as computer software programs. For example, one embodiment includes a computer program product. The computer program product includes a computer program stored in a computer-readable medium. The computer program includes a computer program used for performing a method shown in the flowchart. In such embodiments, the computer program may be downloaded and installed over the network through the communication portion 1909, and/or installed from the detachable medium 1911. When the computer program is executed by the CPU 1901, the various functions defined in the system of this application are executed.

The computer-readable medium shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination of the above. More specific examples of the computer-readable storage medium may include, but are not limited to: an electrical connector having one or more wires, a portable computer disk, a hard disk, a random access memory (RAM), a read-only memory (ROM), an erasable programmable read only memory (EPROM), a flash memory, an optical fiber, a compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. A computer program contained on the computer-readable medium may be transmitted over any suitable medium including, but not limited to a wireless manner, a wired manner, or any suitable combination thereof.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some alternative implementations, the functions labeled in the blocks may occur out of the order labeled in the accompanying drawings. For example, two boxes shown in succession may be performed in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented by software components, or may be implemented by hardware components, and the unit described can also be set in a processor. The names of these units do not, in some cases, constitute a limitation on the units.

As another aspect, this application also provides a computer-readable medium. The computer-readable medium may be included in the electronic device described in the foregoing embodiments. The computer-readable medium may alternatively exist separately and is not fitted into the electronic device. The computer-readable medium carries one or more programs. The one or more programs, when executed by the electronic device, enable the electronic device to implement the method described in the foregoing embodiments.

It is to be understood that this application is not limited to the precise structures described above and shown in the accompanying drawings, and various modifications and changes may be made without departing from the scope of this application. The scope of this application is limited only by the appended claims.

What is claimed is:

1. A deep learning-based filtering method, comprising:
    obtaining a reconstructed image of luma component corresponding to an encoded image and chroma component information corresponding to the encoded image;
    up-sampling the chroma component information corresponding to the encoded image to obtain up-sampled chroma component information having a same size as that of the reconstructed image of luma component, the up-sampled chroma component information comprising: an up-sampled to-be-filtered image of chroma component, an up-sampled prediction image of chroma component, and up-sampled chroma component block partitioning information;
    combining the reconstructed image of luma component and the up-sampled to-be-filtered image of chroma component to generate a first combined image, and extracting a feature of the first combined image to obtain a first feature;
    combining a prediction image of luma component corresponding to the encoded image and the up-sampled prediction image of chroma component to generate a second combined image, and extracting a feature of the second combined image to obtain a second feature;
    combining luma component block partitioning information corresponding to the encoded image and the up-sampled chroma component block partitioning information to generate a third combined image corresponding to the encoded image, and extracting a feature of the third combined image to obtain a third feature;
    generating an input parameter of a deep learning filter according to the first feature, the second feature, and the third feature; and
    generating, based on the input parameter to the deep learning filter, a filtered image corresponding to the reconstructed image of luma component.

2. The method according to claim 1, wherein the generating an input parameter of a deep learning filter comprises:

up-sampling the reconstructed image of chroma component to have a same size as that of the reconstructed image of luma component based on the chroma component information; and performing layer combination on the reconstructed image of luma component and the up-sampled reconstructed image of chroma component; and generating the input parameter of the deep learning filter based on a result of the layer combination.

3. The method according to claim 1, wherein the deep learning filter comprises a convolutional unit, a residual unit, and a shuffle unit connected in sequence, the residual unit comprising at least one residual block.

4. The method according to claim 3, wherein the residual block comprises: a first convolutional layer, a parametric rectified linear unit, and a second convolutional layer connected in sequence, a block input of the residual block is a layer input of the first convolutional layer, and a layer output of the second convolutional layer is superimposed with the layer input of the first convolutional layer to generate a block output of the residual block.

5. The deep learning-based filtering method according to claim 3, wherein the residual block comprises: a first convolutional layer, a parametric rectified linear unit, a second convolutional layer, and a convolutional block attention module connected in sequence, a block input of the residual block is a layer input of the first convolutional layer, and a module output of the convolutional block attention module is superimposed with the layer input of the first convolutional layer to generate a block output of the residual block.

6. The deep learning-based filtering method according to claim 3, wherein the residual block comprises: a first convolutional layer, a parametric rectified linear unit, a third convolutional layer, and a second convolutional layer connected in sequence, a convolution kernel of the first convolutional layer has a same size as a convolution kernel of the third convolutional layer, a block input of the residual block is a layer input of the first convolutional layer, and a layer output of the second convolutional layer is superimposed with the layer input of the first convolutional layer to generate a block output of the residual block.

7. The deep learning-based filtering method according to claim 3, wherein the residual block comprises: a first convolutional layer, a parametric rectified linear unit, a third convolutional layer, a second convolutional layer, and a convolutional block attention module connected in sequence, a convolution kernel of the first convolutional layer has a same size as a convolution kernel of the third convolutional layer, a block input of the residual block is a layer input of the first convolutional layer, and a module output of the convolutional block attention module is superimposed with the layer input of the first convolutional layer to generate a block output of the residual block.

8. The method according to claim 1, further comprising: generating a prediction image of luma component corresponding to a next frame of image based on the filtered image, and encoding or decoding the next frame of video image based on the prediction image of luma component.

9. An electronic device, comprising:
one or more processors; and a storage apparatus, configured to store one or more programs which, when executed by the one or more processors, cause the one or more processors to perform:

obtaining a reconstructed image of luma component corresponding to an encoded image and chroma component information corresponding to the encoded image;

up-sampling the chroma component information corresponding to the encoded image to obtain up-sampled chroma component information having a same size as that of the reconstructed image of luma component, the up-sampled chroma component information comprising: an up-sampled to-be-filtered image of chroma component, an up-sampled prediction image of chroma component, and up-sampled chroma component block partitioning information;

combining the reconstructed image of luma component and the up-sampled to-be-filtered image of chroma component to generate a first combined image, and extracting a feature of the first combined image to obtain a first feature;

combining a prediction image of luma component corresponding to the encoded image and the up-sampled prediction image of chroma component to generate a second combined image, and extracting a feature of the second combined image to obtain a second feature;

combining luma component block partitioning information corresponding to the encoded image and the up-sampled chroma component block partitioning information to generate a third combined image corresponding to the encoded image, and extracting a feature of the third combined image to obtain a third feature;

generating an input parameter of a deep learning filter according to the first feature, the second feature, and the third feature; and generating, based on the input parameter to the deep learning filter, a filtered image corresponding to the reconstructed image of luma component.

10. The device according to claim 9, wherein the generating an input parameter of a deep learning filter comprises:

up-sampling the reconstructed image of chroma component to have a same size as that of the reconstructed image of luma component based on the chroma component information; and performing layer combination on the reconstructed image of luma component and the up-sampled reconstructed image of chroma component; and generating the input parameter of the deep learning filter based on a result of the layer combination.

11. The device according to claim 9, wherein the deep learning filter comprises a convolutional unit, a residual unit, and a shuffle unit connected in sequence, the residual unit comprising at least one residual block.

12. The device according to claim 11, wherein the residual block comprises: a first convolutional layer, a parametric rectified linear unit, and a second convolutional layer connected in sequence, a block input of the residual block is a layer input of the first convolutional layer, and a layer output of the second convolutional layer is superimposed with the layer input of the first convolutional layer to generate a block output of the residual block.

13. The device according to claim 11, wherein one of the residual blocks comprises: a first convolutional layer, a parametric rectified linear unit, a second convolutional layer, and a convolutional block attention module connected in sequence,
    a block input of the residual block is a layer input of the first convolutional layer, and a module output of the convolutional block attention module is superimposed with the layer input of the first convolutional layer to generate a block output of the residual block.

14. The device according to claim 11, wherein the residual block comprises: a first convolutional layer, a parametric rectified linear unit, a third convolutional layer, and a second convolutional layer connected in sequence,
    a convolution kernel of the first convolutional layer has a same size as a convolution kernel of the third convolutional layer, a block input of the residual block is a layer input of the first convolutional layer, and a layer output of the second convolutional layer is superimposed with the layer input of the first convolutional layer to generate a block output of the residual block.

15. The device according to claim 11, wherein the residual block comprises: a first convolutional layer, a parametric rectified linear unit, a third convolutional layer, a second convolutional layer, and a convolutional block attention module connected in sequence,
    a convolution kernel of the first convolutional layer has a same size as a convolution kernel of the third convolutional layer, a block input of the residual block is a layer input of the first convolutional layer, and a module output of the convolutional block attention module is superimposed with the layer input of the first convolutional layer to generate a block output of the residual block.

16. A non-transitory computer-readable medium, storing a computer program which, when executed by one or more processors, causing the one or more processors to implement:
    obtaining a reconstructed image of luma component corresponding to an encoded image and chroma component information corresponding to the encoded image;
    up-sampling the chroma component information corresponding to the encoded image to obtain up-sampled chroma component information having a same size as that of the reconstructed image of luma component, the up-sampled chroma component information comprising: an up-sampled to-be-filtered image of chroma component, an up-sampled prediction image of chroma component, and up-sampled chroma component block partitioning information;
    combining the reconstructed image of luma component and the up-sampled to-be-filtered image of chroma component to generate a first combined image, and extracting a feature of the first combined image to obtain a first feature;
    combining a prediction image of luma component corresponding to the encoded image and the up-sampled prediction image of chroma component to generate a second combined image, and extracting a feature of the second combined image to obtain a second feature;
    combining luma component block partitioning information corresponding to the encoded image and the up-sampled chroma component block partitioning information to generate a third combined image corresponding to the encoded image, and extracting a feature of the third combined image to obtain a third feature;
    generating an input parameter of a deep learning filter according to the first feature, the second feature, and the third feature; and
    generating, based on the input parameter to the deep learning filter, a filtered image corresponding to the reconstructed image of luma component.

17. The method according to claim 3, wherein:
the residual unit comprises a plurality of residual blocks, and
a number of channels of the plurality of residual blocks is the same.

18. The method according to claim 3, wherein:
the residual unit comprises a plurality of residual blocks, and
a number of channels of each of the residual blocks is not exactly the same.

* * * * *